United States Patent
Bryson

(10) Patent No.: US 8,495,086 B2
(45) Date of Patent: Jul. 23, 2013

(54) VERIFYING LICENSES OF MUSICAL RECORDINGS WITH MULTIPLE SOUNDTRACKS

(75) Inventor: Donald Lovell Bryson, Chattanooga, TN (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 12/909,542

(22) Filed: Oct. 21, 2010

(65) Prior Publication Data

US 2012/0102061 A1 Apr. 26, 2012

(51) Int. Cl.
*G06F 17/30* (2006.01)
(52) U.S. Cl.
USPC .......................................... 707/769; 705/902
(58) Field of Classification Search
USPC .......................................... 707/769; 705/902
See application file for complete search history.

(56) References Cited

U.S. PATENT DOCUMENTS

| | | |
|---|---|---|
| 7,707,224 B2 | 4/2010 | Chastagnol et al. |
| 2002/0082837 A1 | 6/2002 | Pitman et al. |
| 2002/0099555 A1 | 7/2002 | Pitman et al. |
| 2008/0091366 A1* | 4/2008 | Wang .............................. 702/71 |
| 2009/0144326 A1 | 6/2009 | Chastagnol et al. |

FOREIGN PATENT DOCUMENTS

WO  WO 2008/028200 A2  3/2008

OTHER PUBLICATIONS

Shen et al, Novel Framework Automated Singer Identification, May 2009.*
Izumitani et al, A Background Music Detection method, Apr. 2008.*
*A Background Music Detection Method Based on Robust Feature Extraction*, T. Izumitani et al., NTT Communication Science Laboratories, IEEE 2008.
*A Novel Framework for Efficient Automated Singer Identification in Large Music Databases*, J. Shen et al., ACM Transactions on Information Systems, vol. 27, Article 18, May 2009.

* cited by examiner

*Primary Examiner* — Amresh Singh
(74) *Attorney, Agent, or Firm* — J. B. Kraft; Steven L. Bennett

(57) ABSTRACT

Distinguishing the background musical soundtrack from a secondary musical soundtrack of a licensed musical recording; mapping a sequential pattern of background musical fingerprints for the background musical soundtrack of the licensed recording; mapping a sequential pattern of secondary musical fingerprints for the secondary musical soundtrack of the licensed recording; and storing the background musical fingerprint patterns and the secondary musical fingerprint patterns in a database of licensed musical recordings.

15 Claims, 6 Drawing Sheets

| BK1 and DK1 Same (background only) | BK1 and DK1 Different (with singer) |
|---|---|
| N1 | |
| N2 | |
| | (N3) |
| | (N4) |
| N5 | |
| | N6 |

FIG. 3

| Sample matches BK1 | Matches L1 |
|---|---|
| N1 | |
| N2 | |
| | N3 |
| | N4 |
| N5 | |
| | N6 |

FIG. 4

VERIFYING LICENSES OF MUSICAL RECORDINGS WITH MULTIPLE SOUNDTRACKS

TECHNICAL FIELD

The present invention relates to verifying the licenses of musical recordings and particularly of musical recordings having multiple soundtracks.

BACKGROUND OF RELATED ART

Background musical recording soundtracks are extensively distributed by music publishers to be used for entertainment purposes wherein a singer then provides his vocal input along with the running background soundtrack. This is a standard practice with karaoke and even rap music background soundtracks, but it may also be used as background tracks by musicians who may wish to entertain by providing their "sit in" input against a background of a recorded jazz or country group. In the classical music milieu, a publisher may supply a continuos background soundtrack, against which students may wish to practice their individual instruments. By standard practice, the publishers do not sell their background tracks with mechanical rights, i.e. the licensing rights to use such background soundtracks for further recording. Such rights normally must be secured from the publisher; or, more likely, from providers that represent the publisher in licensing.

However, even if the background soundtrack may be licensed, one or more secondary tracks recorded as vocals or other secondary music may not be licensed.

SUMMARY OF THE PRESENT INVENTION

The present invention has recognized that its often the case, that even with basic background soundtrack recordings that have been licensed, a vocal secondary soundtrack recorded simultaneously with or superimposed upon the basic background soundtrack will not be licensed. With electronic advancements that have made quality recording capabilities available to a growing number of potential recording publishers of secondary recorded soundtracks, e.g. karaoke, rap songs or jazz and country music, the present invention has recognized a need for a convenient and inexpensive way for smaller publishers of background/secondary soundtracks to obtain licenses on such combined soundtracks.

The present invention provides an implementation that facilitates the licensing of musical recordings having a background and secondary music soundtracks and that facilitates the verification of such licenses by potential users of the recordings. Accordingly, one general aspect of the invention comprises distinguishing the background musical soundtrack from a secondary musical soundtrack of a licensed musical recording; mapping a sequential pattern of background musical fingerprints for the background musical soundtrack of the licensed recording; mapping a sequential pattern of secondary musical fingerprints for the secondary musical soundtrack of the licensed recording; and storing the background musical fingerprint patterns and the secondary musical fingerprint patterns in a database of licensed musical recordings.

A musical recording under test for whether it is licensed, is sequentially compared to the stored background and secondary musical fingerprint patterns and an indication of a non-licensed musical recording is made upon a failure in said comparison.

According to an aspect of the invention, provision is made for the mapping of the combined background musical fingerprint patterns and the secondary vocal musical fingerprint patterns of a licensed recording including:

taking a periodic sequence of fingerprints of a model musical recording having both model background soundtracks and model secondary vocal soundtracks; taking the same periodic sequence of fingerprints of only the background musical soundtrack; and comparing the periodic sequence of background musical soundtrack fingerprints with the sequence of model musical recording fingerprints for matching fingerprints. The sequential points of matching fingerprints is stored as the sequence for mapping the background musical fingerprint pattern, and the sequential points of non-matching fingerprints is stored as the sequence for mapping the secondary vocal musical fingerprint pattern.

In accordance with another aspect of the invention, the stored sequential points of matching fingerprints and sequential points of non-matching fingerprints may be used to register a licensed musical recording having a background soundtrack and a secondary soundtrack in an appropriate repository by taking the fingerprints of the registered licensed music at the sequential points of the matching fingerprints to provide said background musical soundtrack fingerprint pattern; taking the fingerprints of the registered licensed music at the sequential points of the non-matching fingerprints to provide the mapped secondary vocal musical soundtrack fingerprint pattern; and storing the combined background and secondary fingerprint patterns of said registered licensed musical recording. The combined fingerprint patterns may be interleaved into a unitary mapped fingerprint pattern to be applied to the musical recording under test. These stored combined fingerprint patterns may be compared to fingerprint patterns taken from recordings under test to determine whether the recording under test is licensed.

According to another aspect of the invention, a plurality of versions of a musical recording are stored; each stored version having at least a mapped secondary fingerprint pattern different from the mapped secondary fingerprint patterns of the other stored versions; and the mapped background and secondary musical fingerprint patterns are progressively compared to the musical recording under test in sequence to determine whether the recording under test is licensed for one of the versions.

BRIEF DESCRIPTION OF THE DRAWING

The present invention will be better understood and its numerous objects and advantages will become more apparent to those skilled in the art by reference to the following drawings, in conjunction with the accompanying specification, in which:

FIG. 3 is a chart showing a sequence of points at which fingerprints are taken in the mapping of fingerprint patterns for both the background and secondary soundtracks to be stored for licensed musical recordings and to be used in comparing musical soundtracks under test to determine whether or not they are licensed;

FIG. 4 is a chart showing a sequence of points at which fingerprints are taken in the mapped fingerprint patterns for both the background and secondary soundtracks stored for licensed musical recordings to be used in comparing musical soundtracks under test to determine whether licensed;

DETAILED DESCRIPTION OF THE PREFERRED EMBODIMENT

Figure 1:
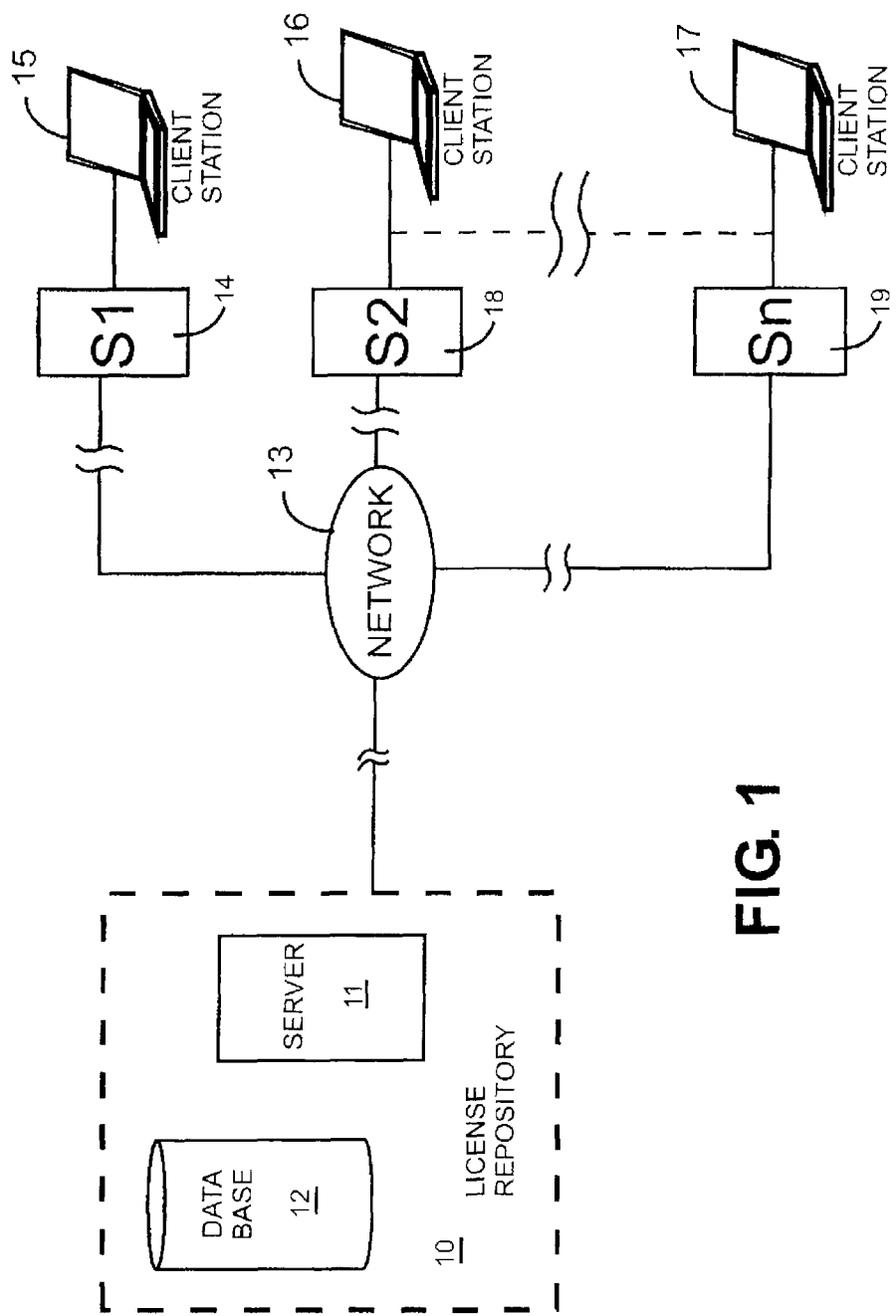
FIG. 1 is a generalized diagrammatic view of a network portion, illustrating an embodiment that may be used for issuing licenses and registering such licenses for musical recordings having background and secondary soundtracks and for determining whether such recordings are licensed in accordance with this invention.

Referring to FIG. 1, there is shown a generalized diagrammatic view of a network portion, illustrating an embodiment that may be used for issuing licenses and registering such licenses for musical recordings having background and secondary soundtracks and for determining whether such recordings are licensed in accordance with this invention.

License repository 10, which may be provided and controlled by a licensing service provider, supports the licensing functions to be hereinafter described with respect to FIGS. 3 through 6. Server 11 supports database 12 and provides processor and operating system support for the programming functions to be hereinafter described. Client stations 15, 16 and 17 are representative of all user terminals from which a user may access repository 11 through respective network servers 14, 18 and 19, and network 13, such as the World Wide Web ("Web") for the purpose of licensing the multiple soundtrack musical recordings, recording and storing such licenses in the repository, as well as determining whether a particular multiple track recording is licensed.

Figure 2:
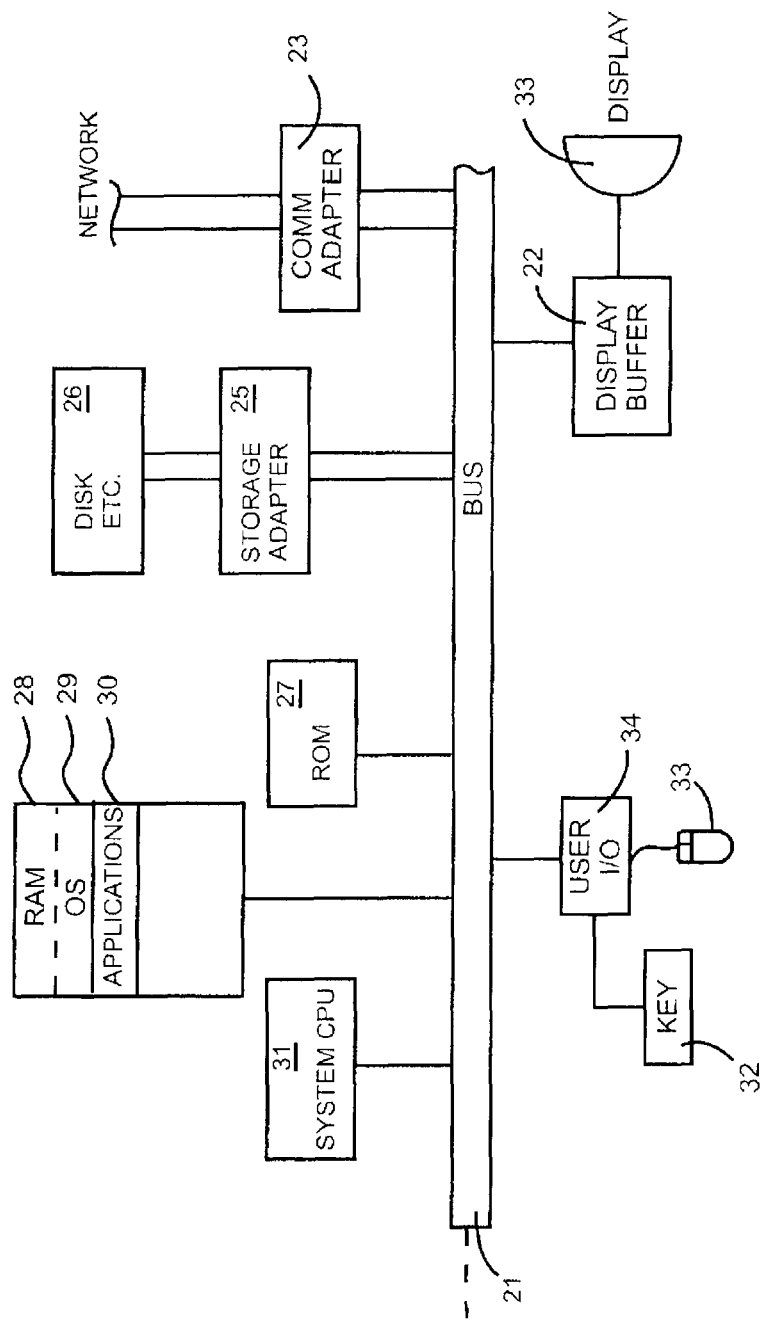
FIG. 2 is an illustrative diagrammatic view of a control processor that may be used for the server of the license repository of FIG. 1, as well as for the servers for the client stations shown in FIG. 1.

With respect to FIG. 2, there is shown an illustrative diagrammatic view of a control processor that may be used for the server 11 of FIG. 1, or for any of the client station servers S1-Sn, 14, 15 and 19. A central processing unit (CPU) 31, such as one of the microprocessors, e.g. from System p™ series available from International Business Machines Corporation ("IBM"), is provided and interconnected to various other components by system bus 21. An operating system OS 29 runs on CPU 31, provides control and is used to coordinate the function of the various components of FIG. 2. Operating system 29 may be one of the commercially available operating systems. Application programs 30, controlled by the system in server 11, including the applications of the present invention are moved into and out of the main memory Random Access Memory ("RAM") 28. Programming applications that may be used to implement functions of the system are stored in a Read Only Memory ("ROM") 27 connected to CPU 31 via bus 21. ROM 27 includes the Basic Input/Output System ("BIOS") that controls the basic computer functions of the server system. RAM 28, storage adapter 25 and communications adapter 23 are also interconnected to system bus 21. Storage adapter 25 communicates with the disk storage device 26. Communications adapter 23 interconnects bus 21 with an outside Web or like network 13. I/O devices are also connected to system bus 21 via user interface adapter 34. Optionally, keyboard 32 and mouse 33 may be connected to bus 21 through user interface adapter 34. Where a display is used, display buffer 22 supports display 33.

It should be noted that throughout this description, the term fingerprint i.e. acoustical fingerprints has been used. The acoustical fingerprinting technology is established in defining and comparing musical recordings for licensing purposes. Thus, any conventional acoustical fingerprinting may be used in the practice of this invention.

Now, with respect to FIGS. 3 through 7, specific implementations of the present invention will be described.

Three major sequential aspects of the invention are:

I. Identification of the periodic sequential points in the background musical soundtrack and in secondary musical, e.g. vocal soundtrack that should be sampled in order to form the mapped fingerprint patterns of the background and vocal soundtracks to be used to identify a licensed musical recording with background and vocal soundtracks. It should be noted that in the descriptions that follow the secondary soundtrack will be illustrated as a vocal track. However, it is not intended that the application be limited to implementations wherein the secondary track is only vocal. The present invention is applicable to embodiments wherein the secondary track is instrumental and wherein there are a plurality of secondary soundtracks.

II. Sampling the periodic sequential points in the background musical soundtrack and in the secondary vocal soundtrack identified aspect I. above in order to form the mapped fingerprint patterns of the background and vocal soundtracks of the specific licensed recording, which is, in effect, the acoustical signature of the licensed recording including both the acoustical signature of the background and vocal tracks, that is registered and stored at the license repository.

III. Comparing the stored mapped fingerprint patterns of aspect II. to a recording under test to determine whether the recording is licensed.

I. Determining the Sequential Points in the Two Soundtracks that Must be Mapped

With reference to the Table of FIG. 3, Master background soundtracks distributed with the published background soundtrack have multiple versions of the background track in different keys. Along with the distributed multiple versions of the background track is a demonstration or model track that includes background music mixed with vocals so that a singer may practice the song and integrate vocals. In the Table in FIG. 3, the published music example is identified as follows:

BK1—background music without vocals in a first key
DK1—demo, i.e. model track in same key as BK1 (includes both background and song track)
BK2—background music without vocals in another key
BK3—background music w/o vocals in yet another key An acoustical fingerprint of both the background track BK1 and DK1 (the demo or model) soundtrack is simultaneously taken every N-seconds. Column 40 of the table. FIG. 3, will provide the mapped fingerprint pattern of BK1 (the background soundtrack in key 1), i.e the mapped fingerprint pattern at time periods N1, N2 and N5 since there are no vocals at these points. This fingerprint pattern will identify background soundtrack BK1 while column 41 shows the time sequence at which the vocal secondary track is sampled and identified: N3, N4 and N5. It is at these positions in column 41 that DK1 and BK1 are different. It is this secondary track of mapped points that should be sampled in determining whether derivative vocal works using background soundtrack BK1 are licensed. A similar comparison is made for the other background tracks in different keys BK2 and BK3, and the results are also stored at the repository.

II. Determining and Recording Fingerprint Pattern for Registering Licensed Derivative Song (Secondary)

For the purpose of this continuing example, a singer has used the background track already licensed to her and made a vocal recording (secondary soundtrack) that is also to be licensed. Since the background soundtrack is already licensed, the soundtrack of the singer's recording is scanned and the acoustical fingerprints taken at points N1, N2 and N3 (FIG. 3) provide the pattern or signature that determines which of versions, i.e. background soundtracks BK1, BK2 or BK3, was used as the background soundtrack. The appropriate fingerprint pattern N1, N2 and N5, is stored as the background track. Now for the recorded song, the fingerprint pattern at N2, N3 and N6, identifies the secondary vocal or singing soundtrack that is stored in combination with the stored background pattern at the repository 19 of FIG. 1. This will identify the combined licensed background track and song track for this licensed recorded music.

This process is repeated for each licensed sound recording using a background track (either BK1, BK2 or BK3). For the purpose of this continued example, assume that there are two licensed sound recordings. Thus, the acoustical signatures (combined fingerprints) for two different singers (license L1 and license L2). Since the background track is licensed with the signatures of fingerprints at N1, N2 and N5, table column 40, FIG. 3, the distinctive licensed secondary song versions will be for the two singers:

L1-N3, L1-N4 and L1-N6, first singer; and
L2-N3, L2-N4 and L2-N6, second singer.

III. Comparing a Musical Recording with a Background Soundtrack and a Secondary Vocal Track Against Stored Licensed Fingerprint Signatures Now that the licensed musical recordings with background tracks and secondary song tracks have been registered and stored, some situations will be described regarding licensing inquiries. These usually come from users who wish to use the recordings for commercial purposes and wish to confirm that the recording is or is not licensed. With reference to FIG. 4, the recording under test is sampled at the same intervals as the stored fingerprint patterns. Thus, if the music recording under test is licensed under License L1, the sample's fingerprint pattern should match BK1 background soundtrack at intervals N1, N2 and N5, column 42 in the table of FIG. 4, and the sample's fingerprint pattern should match the stored songtrack at intervals N3, N4 and N6, column 43. Then a "licensed" message would be returned from the repository 10, FIG. 1, to the inquiring person. On the other hand, if the recorded music under test fails to match the first version, the process is repeated for each successive stored licensed version, e.g. L2-N3, L2-N4 and L2-N6. If the recording under test has a licensed background soundtrack but an unlicensed secondary vocal track, a license violation will be flagged.

In another situation wherein the music recording is a completely new song recording in which none of the background tracks are used, then there will be no match (column 43 of the table in FIG. 4). An output will be provided to indicate that the submitted music recording is free of any infringement of a license stored in the repository 10, FIG. 1.

As will be appreciated by one skilled in the art, aspects of the present invention may be embodied as a system, method or computer program product. Accordingly, aspects of the present invention may take the form of an entirely hardware embodiment, an entirely software embodiment, including firmware, resident software, micro-code, etc.; or an embodiment combining software and hardware aspects that may all generally be referred to herein as a "circuit", "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a Random Access Memory ("RAM"), a Read Only Memory ("ROM"), an Erasable Programmable Read Only Memory ("EPROM" or Flash memory), an optical fiber, a portable compact disc read only memory ("CD-ROM"), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable medium may include a propogated data signal with computer readable program code embodied therein, for example, in baseband or as part of a carrier wave. Such a propogated signal may take any of a variety of forms, including, but not limited to, electromagnetic, optical, or any suitable combination thereof. A computer readable signal medium may be any computer readable medium that is not a computer readable storage medium and that can communicate, propogate or transport a program for use by or in connection with an instruction execution system, apparatus or device.

Program code embodied on a computer readable medium may be transmitted using any appropriate medium, including, but not limited to, wireless, wireline, optical fiber cable, RF, etc., or any suitable combination the foregoing.

Computer program code for carrying out operations for aspects of the present invention may be written in any combination of one or more programming languages, including an object oriented programming language, such as Java, Smalltalk, C++ and the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the later scenario, the remote computer may be connected to the user's computer through any type of network, including a local area network ("LAN") or a wide area network ("WAN"), or the connection may be made to an external computer (for example, through the Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that instructions, which execute via the processor of the computer or other programmable data processing apparatus, create means for implementing the functions/acts specified flowchart and/or block diagram block or blocks.

These computer program instructions may also be stored in a computer readable medium that can direct a computer, other programmable data processing apparatus or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
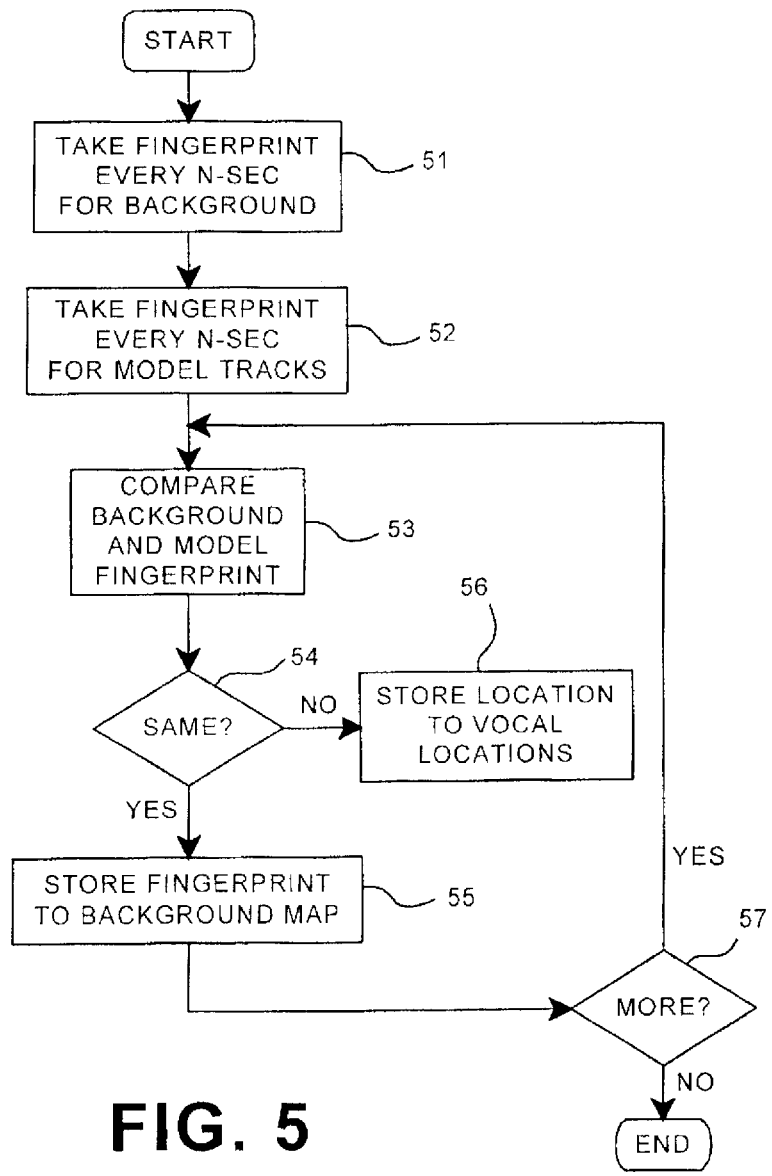
FIG. 5 is a flowchart of an illustrative program routine showing the determination of the sequence of points at which fingerprints are taken in the mapping of the specific fingerprint patterns for both the background and secondary soundtracks to be stored for licensed musical recordings.
Figure 6:
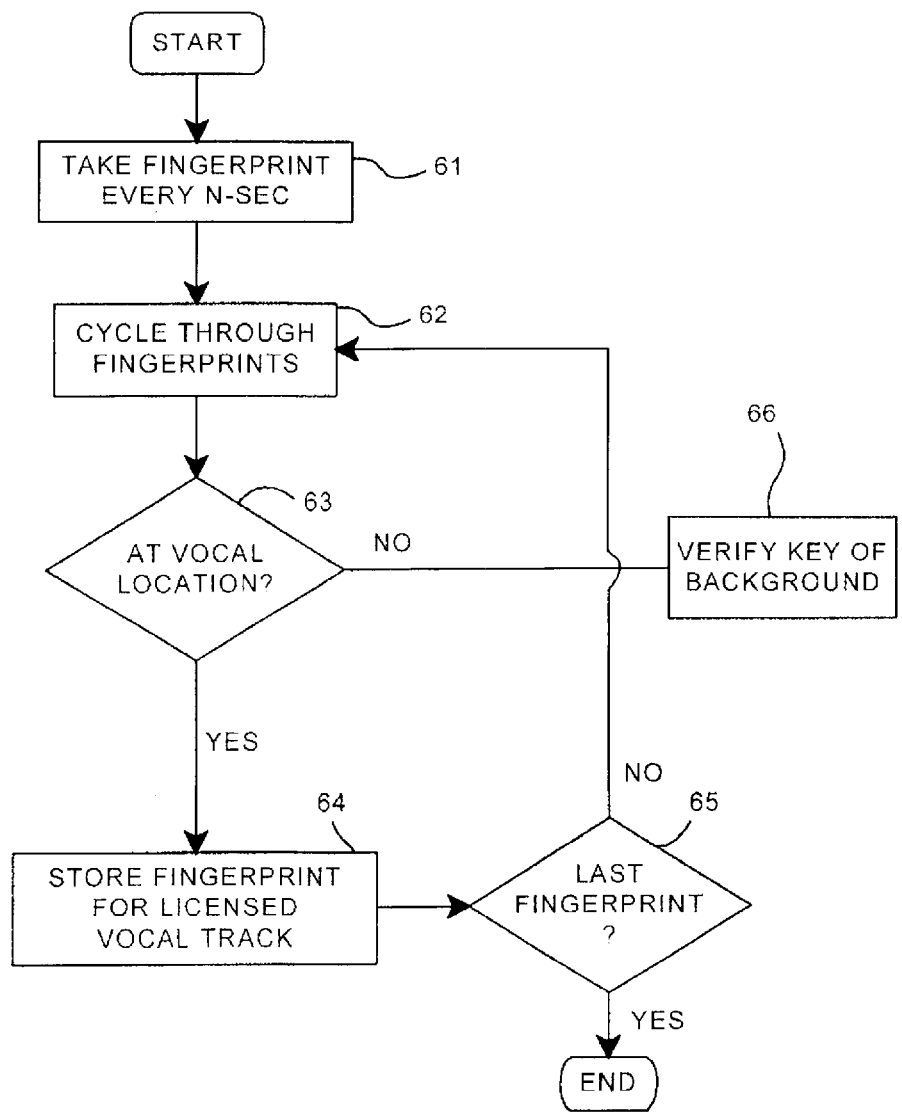
FIG. 6 is a flowchart of an illustrative program routine showing how specific fingerprint patterns for both the background and secondary soundtracks to be used to identify a licensed recording are developed by using the sequence of points provided by the routine of FIG. 5.
Figure 7:
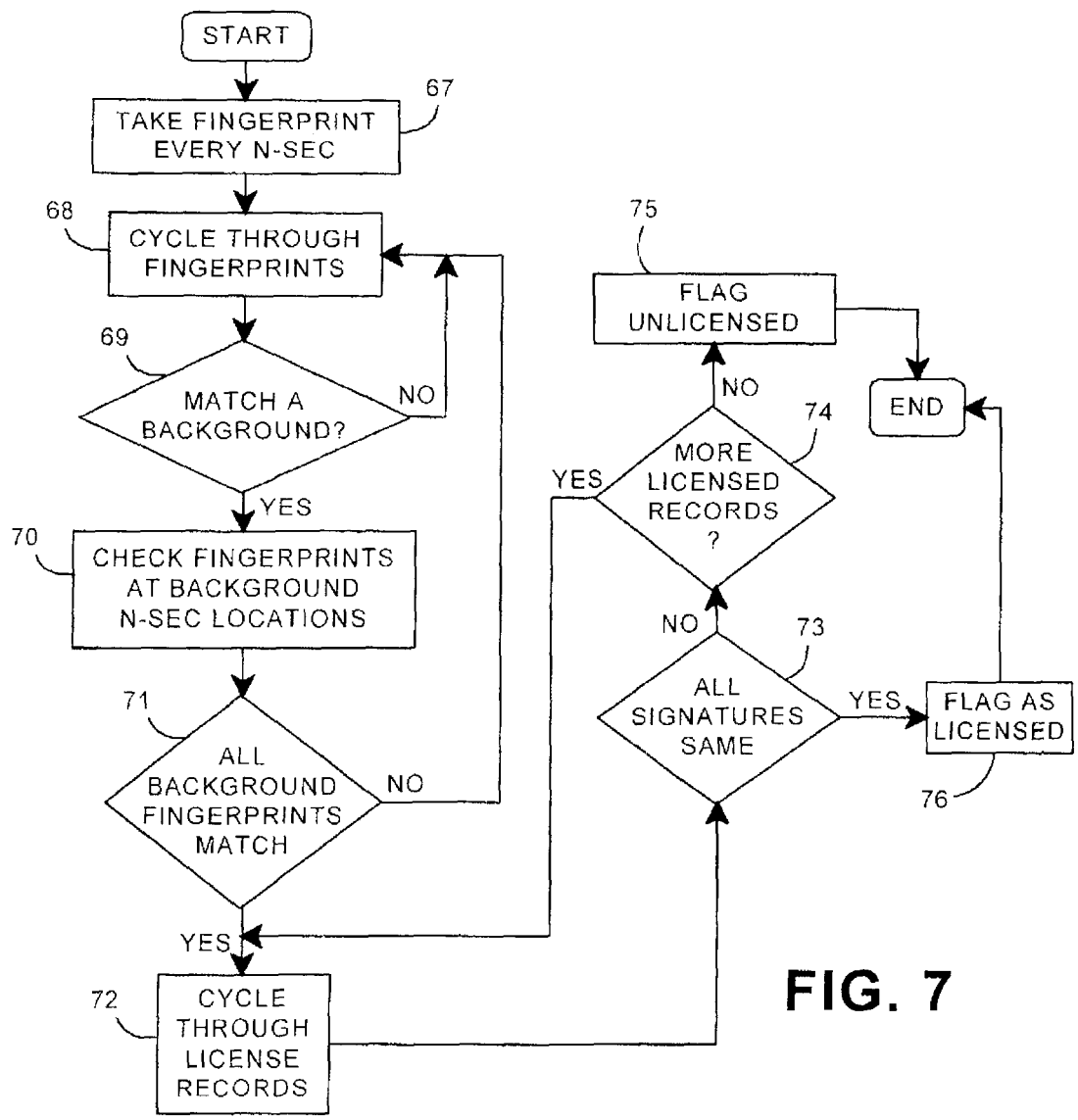
FIG. 7 is a flowchart of an illustrative program routine used in determining whether a musical recording under test is licensed by using the specific mapped fingerprint patterns provided by the routine of FIG. 6.

Now, with respect to FIGS. 5 through 7, a simplified illustrative run of each of a program routine for each of the above-described sections I through III (major aspects of the invention).

I. Determining the Sequential Points in the Two Soundtracks that Must be Mapped (Flowchart (FIG. 5))

In FIG. 5, a fingerprint is taken every N seconds for the background track 51. Likewise, a fingerprint is taken every N seconds for the Model (Demo) track 52. The fingerprint patterns of the two are compared 53. If the decision 54 is Yes there is a match, then the fingerprint is stored for the background map 55. If No, the location is stored as a location at which the secondary vocal (song) will be taken 56. At each iteration, a decision 57 is made as to whether there are still further iterations at which the fingerprints of the model and background tracks are to be matched. If Yes, the process is returned to step 53. If No, the process is complete and, thus, ended.

II. Determining and Recording Fingerprint Pattern for Registering Licensed Derivative Song (Flowchart (FIG. 6))

With a new derivative musical recording in which there is a vocal track to be licensed and stored in the repository for protection against infringement, the process of FIG. 6 takes the fingerprint every N seconds 61, and thereby cycles through the fingerprints 62. At each N interval a decision is made 63 as to whether the location is one at which the fingerprint of a vocal track is to be taken (the location was previously determined in FIG. 5). If Yes, the fingerprint at that location is stored for the licensed track 64. If No, the key of the background track is verified at this N point fingerprint 66. After this decision a further decision 65 is made as to whether, the process has completed the last sequential fingerprint. If Yes, the process is complete. If No, the process is returned to step 62 and continued.

III. Comparing a Musical Recording with Background Soundtrack and Secondary Vocal Track Against Stored Licensed Fingerprint Signatures (Flowchart (FIG. 7))

Now with respect to FIG. 7, when a music recording having a background and a secondary song track is submitted for a determination in the licensing repository as to whether the recording under test is licensed, the process takes the fingerprint every N seconds 67 and, thereby, cycles through the fingerprints 68. At each N interval a decision is made 69 as to whether there is a match with a particular background track. If No, the process is returned to step 68. If Yes, all of the fingerprints at the N second location in the background track are checked 70 and a decision 71 is made as to whether the background fingerprint pattern of the recording under test matches the licensed background track. If No, the process is returned to step 68. If Yes, then the license records in the repository for the secondary vocal or song track are cycled through 72 and a decision 73 made as to whether a stored licensed track signature match is made with the song track under test, i.e. the song track fingerprint pattern matches a stored licensed track. If Yes, the music recording under test is flagged as licensed 76 and the process is ended. If decision 73 is No, a decision 74 is made as to whether there are more song track license records in the repository to be cycled through. If Yes, the process is returned to step 72. If No, the music recording under test is flagged as licensed 76 and the process is ended.

The flowchart and block diagram in the Figures illustrate the architecture, functionality and operations of possible implementations of systems, methods and computer program products according to various embodiments of the present invention. In this regard, each block in the flowchart or block diagrams may represent a module segment, or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations can be implemented by special purpose hardware-based systems that perform the specified functions or acts, or combinations of special purpose hardware and computer instructions.

Although certain preferred embodiments have been shown and described, it will be understood that many changes and modifications may be made therein without departing from the scope and intent of the appended claims.

What is claimed is:

1. A method for verifying that musical recordings having a background musical soundtrack and at least one secondary musical soundtrack including vocal music are licensed comprising:
   distinguishing said background musical soundtrack from a secondary musical soundtrack of a licensed musical recording;
   taking a periodic sequence of fingerprints of a model musical recording having both model background soundtracks and model secondary vocal soundtracks;
   taking said same periodic sequence of fingerprints of only said background musical soundtrack;
   comparing the periodic sequence of background musical soundtrack fingerprints with said sequence of model musical recording fingerprints for matching fingerprints;
   storing the sequential points of matching fingerprints as the sequence for mapping the background musical fingerprint pattern;
   storing the sequential points of non-matching fingerprints as the sequence for mapping the secondary vocal musical fingerprint pattern;

storing said background musical fingerprint patterns and said secondary musical fingerprint patterns in a database of licensed musical recordings;

sequentially comparing a musical recording under test to determine whether the recording under test is licensed to said stored background and secondary musical fingerprint patterns; and indicating a non-licensed musical recording upon a failure in said comparison.

2. The method of claim 1, includes registering a licensed musical recording by:

taking the fingerprints of the registered licensed musical at the sequential points of said matching fingerprints to provide said mapped background musical soundtrack fingerprint pattern;

taking the fingerprints of the registered licensed musical at the sequential points of said non-matching fingerprints to provide said mapped secondary vocal musical soundtrack fingerprint pattern; and storing said background and secondary fingerprint patterns of said registered licensed musical recording.

3. The method of claim 2, further including comparing said stored background and secondary fingerprint patterns of said registered licensed musical recording to fingerprint patterns taken from recording under test to determine whether the recording under test is licensed.

4. The method of claim 3 wherein:

a plurality of versions of a musical recording are stored, each stored version having at least a mapped secondary fingerprint pattern different from the mapped secondary fingerprint patterns of the other stored versions; and said mapped background and secondary musical fingerprint patterns are progressively compared to said musical recording under test in sequence to determine whether the recording under test is licensed for one of said versions.

5. The method of claim 4 wherein said mapped background and secondary musical fingerprint patterns are interleaved into a unitary mapped fingerprint pattern to be applied to the musical recording under test.

6. A computer controlled system for verifying that musical recordings having a background musical soundtrack and at least one secondary musical soundtrack including vocal music are licensed, said system comprising:

a processor; and a computer memory holding computer program instructions which when executed by the processor perform the method comprising:

distinguishing said background musical soundtrack from a secondary musical soundtrack of a licensed musical recording;

taking a periodic sequence of fingerprints of a model musical recording having both model background soundtracks and model secondary vocal soundtrack;

taking said same periodic sequence of fingerprints of only said background musical soundtrack;

comparing the periodic sequence of background musical soundtrack fingerprints with said sequence of model musical recording fingerprints for matching fingerprints;

storing the sequential points of matching fingerprints as the sequence for mapping the background musical fingerprint pattern;

storing the sequential points of non-matching fingerprints as the sequence for mapping the secondary vocal musical fingerprint pattern;

storing said background musical fingerprint patterns and said secondary musical fingerprint patterns in a database of licensed musical recordings;

sequentially comparing a musical recording under test to determine whether the recording under test is licensed to said stored background and secondary musical fingerprint patterns; and indicating a non-licensed musical recording upon a failure in said comparison.

7. The system of claim 6, wherein the performed method includes registering a licensed musical recording by:

taking the fingerprints of the registered licensed musical at the sequential points of said matching fingerprints to provide said mapped background musical soundtrack fingerprint pattern;

taking the fingerprints of the registered licensed musical at the sequential points of said non-matching fingerprints to provide said mapped secondary vocal musical soundtrack fingerprint pattern; and storing said background and secondary fingerprint patterns of said registered licensed musical recording.

8. The system of claim 7, said performed method further including comparing said stored background and secondary fingerprint patterns of said registered licensed musical recording to fingerprint patterns taken from recording under test to determine whether the recording under test is licensed.

9. The system of claim 8 wherein:

a plurality of versions of a musical recording are stored, each stored version having at least a mapped secondary fingerprint pattern different from the mapped secondary fingerprint patterns of the other stored versions; and said mapped background and secondary musical fingerprint patterns are progressively compared to said musical recording under test in sequence to determine whether the recording under test is licensed for one of said versions.

10. The system of claim 9 wherein said mapped background and secondary musical fingerprint patterns are interleaved into a unitary mapped fingerprint pattern to be applied to the musical recording under test.

11. A computer usable non-transitory storage medium having stored thereon a computer readable program for verifying that musical recordings having a background musical soundtrack and at least one secondary musical soundtrack including vocal music are licensed, wherein the computer readable program when executed on a computer causes the computer to:

distinguish said background musical soundtrack from a secondary musical soundtrack of a licensed musical recording;

take a periodic sequence of fingerprints of a model musical recording having both model background soundtracks and model secondary vocal soundtracks;

take said same periodic sequence of fingerprints of only said background musical soundtrack;

compare the periodic sequence of background musical soundtrack fingerprints with said sequence of model musical recording fingerprints for matching fingerprints;

store the sequential points of matching fingerprints as the sequence for mapping the background musical fingerprint pattern;

store the sequential points of non-matching fingerprints as the sequence for mapping the secondary vocal musical fingerprint pattern;

store said background musical fingerprint patterns and said secondary musical fingerprint patterns in a database of licensed musical recordings;

sequentially compare a musical recording under test to determine whether the recording under test is licensed to said stored background and secondary musical fingerprint patterns; and indicate a non-licensed musical recording upon a failure in said comparison.

12. The computer usable medium of claim 11, wherein the computer program when executed causes the computer to register a licensed musical recording by instructions to:

take the fingerprints of the registered licensed musical at the sequential points of said matching fingerprints to provide said mapped background musical soundtrack fingerprint pattern;

take the fingerprints of the registered licensed musical at the sequential points of said non-matching fingerprints to provide said mapped secondary vocal musical soundtrack fingerprint pattern; and store said background and secondary fingerprint patterns of said registered licensed musical recording.

13. The computer usable medium of claim 12, wherein the computer program when executed on a computer further causes the computer to compare said stored background and secondary fingerprint patterns of said registered licensed musical recording to fingerprint patterns taken from recording under test to determine whether the recording under test is licensed.

14. The computer usable medium of claim 13 wherein:

a plurality of versions of a musical recording are stored, each stored version having at least a mapped secondary fingerprint pattern different from the mapped secondary fingerprint patterns of the other stored versions; and said computer program when executed causes the computer to progressively compare said mapped background and secondary musical fingerprint patterns to said musical recording under test in sequence to determine whether the recording under test is licensed for one of said versions.

15. The computer usable medium of claim 14 wherein said mapped background and secondary musical fingerprint patterns are interleaved into a unitary mapped fingerprint pattern to be applied to the musical recording under test.

* * * * *